US00RE35146E

United States Patent [19]

Frolov

[11] E Patent Number: Re. 35,146

[45] Reissued Date of Patent: Jan. 16, 1996

[54] ELECTROMAGNETIC SHEAR LOCK

[75] Inventor: George Frolov, Farmington, Conn.

[73] Assignee: Harrow Products, Inc., Grand Rapids, Mich.

[21] Appl. No.: 49,001

[22] Filed: Apr. 16, 1993

Related U.S. Patent Documents

Reissue of:

[64] Patent No.: 5,016,929
Issued: May 21, 1991
Appl. No.: 366,864
Filed: Jun. 13, 1989

[51] Int. Cl.[6] ..... E05C 17/56

[52] U.S. Cl. ..... 292/251.5; 292/302; 292/DIG. 53

[58] Field of Search ..... 292/251.5, 302, 292/DIG. 53, 300, 74

[56] References Cited

U.S. PATENT DOCUMENTS

| | | | |
|---|---|---|---|
| 3,993,972 | 11/1976 | Barbrook . | |
| 4,439,808 | 3/1984 | Gillham . | |
| 4,487,439 | 12/1984 | McFadden | 292/251.5 |
| 4,491,816 | 1/1985 | Blum . | |
| 4,562,665 | 1/1986 | Blackston | 49/44 |
| 4,652,028 | 3/1987 | Logan et al. | 292/251.5 |
| 4,682,801 | 7/1987 | Cook et al. | 292/251.5 |
| 4,688,012 | 8/1987 | Bohg et al. . | |
| 4,716,393 | 12/1987 | Logie . | |
| 4,720,128 | 1/1988 | Logan, Jr. et al. | 292/251.5 |
| 4,826,223 | 5/1989 | Geringer et al. | 292/251.5 |
| 4,840,411 | 6/1989 | Sowersby | 292/251.5 |
| 4,957,316 | 9/1990 | Frolov | 292/251.5 |

*Primary Examiner*—Rodney M. Lindsey
*Attorney, Agent, or Firm*—Chilton, Alix & Van Kirk

[57] ABSTRACT

An electromagnetic shear lock comprising an electromagnet assembly adapted to be mounted to a doorway and an armature assembly adapted to be mounted to a door in a position to be attracted to tile electromagnet, the electromagnet comprises an elongated core of E-shape in cross section with an energizing coil positioned about the middle leg of said E-shaped core and between the outer legs of said E-shaped core. The electromagnet assembly in one embodiment has projections on either side and at both ends thereof extending beyond the surfaces of the core. An armature member has a generally rectangular surface adapted to be mounted to a door and positioned to be attracted by the electromagnet, the armature is relieved at the corners thereof whereby when the armature is attracted to the electromagnet the projections on the extension members extend into the relieved portions of the armature. In an alternate embodiment the armature is recessed at either end thereof intermediate the longitudinal edges and the projections from the electromagnet assembly are received in the recesses. The armature assembly comprises an elongated base member adapted to be secured to a door, the base member receives at least two devices therethrough with the heads of devices extending above the base member. an elongated armature having spaced apart recesses receives and rests on the heads when not attracted to the electromagnet, an elongated leaf spring is secured to the armature intermediate the ends thereof and is secured to the base member adjacent the ends of whereby the spring exerts a return force on the armature when the armature is attracted to said electromagnet.

30 Claims, 4 Drawing Sheets

ELECTROMAGNETIC SHEAR LOCK

Matter enclosed in heavy brackets [ ] appears in the original patent but forms no part of this reissue specification; matter printed in italics indicates the additions made by reissue.

FIELD OF THE INVENTION

This invention relates to electromagnetic door locks, and more particularly, to electromagnetic door locks of the type known as shear locks.

BACKGROUND OF THE INVENTION

Electromagnetic security locks are well known in which an electromagnet is mounted to one of a door frame or a door and an armature is mounted to the other. In the predominant installations of such locks, the armature and electromagnet are generally mounted so that the face of the electromagnet and armature is parallel with a plane of the door and the holding force or attractions between the electromagnet and armature is perpendicular to the door when in a closed position. Such locks are known as surface locks. An attempted forced opening of the door is resisted by the electromagnetic traction of the armature to the electromagnet.

This type of arrangement is very effective, providing a locking force against unauthorized opening of a door. However, as is generally the case, the armature must be mounted on the vertical surface of the door, while the electromagnet is mounted from the door frame and overhangs the top edge of the door. This type of lock, while very effective from a security standpoint, is not suitable for mounting on many types of swinging or double-acting doors.

Also, in many instances, for aesthetic purposes, a better concealment of the electromagnetic lock is desirable. This has led to increased popularity of the so called shear lock, in which the electromagnet is mounted within the door frame and an armature is mounted at or adjacent the top edge of the door and is adapted to be attracted to time electromagnet when the door is in a closed position. It is also possible to mount the electromagnet in the door sill and the armature in the bottom of the door.

This type of magnetic shear lock presents some technical problems which must be considered. When such a magnetic shear lock is mounted to a door and frame such that the electromagnet will exert an upward or downward pull on the armature to achieve locking of the door, there must be some mechanical locking effort because the full magnetic attraction of the armature to the electromagnet is not available as a holding force when an attempt is made to produce shearing movement between the armature and the electromagnet.

This problem has been recognized in U.S. Pat. No. 4,562,665, which discloses an armature mounted in the door which has two projections with vertical side walls which fit into two mating recesses in the electromagnet. Thus, when the armature is attracted to the electromagnet, the projections extend into the recesses and provide a mechanical lock. This type of construction does not take into account the possible effects of residual magnetism in the electromagnet when it may be deenergized to permit opening of the door. particularly if an opening force is applied to the door at the same time the electromagnet is de-energized. Specifically, if there is an attempt being made to open the door when the electromagnet is deenergized, the residual magnetism may still provide attraction between the armature and the electromagnet, and the vertical surfaces of the projections in the recesses will prevent opening of the door.

This problem appears to have been recognized in U.S. Pat. No. 4,487,439 in Which a non-magnetic projection is placed in one of the armature and the electromagnet, and a recess placed in the other, and a beveled edge is defined on the projection to enable the armature to be pushed away from the electromagnet by a force attempting to open the door when the electromagnet is deenergized. In this construction, the projection has a matching circular indentation or recess somewhat larger in diameter than the projection. However, this type of construction suffers from a drawback in that when an attempt is made for unauthorized opening of the door, the circular pin or projection only makes a point contact with the recess in the armature, and this will very quickly show signs of wear after attempts to force the lock by applying shear force. This construction also suffers from the standpoint of the magnetic attraction between the electromagnet and the armature being reduced by the introduction of the non-magnetic member.

The problem of the residual magnetism in an electromagnetic shear lock which includes a mechanical reinforcing structure of the electromagnet, when energized, as discussed in U.S. Pat. No. 4,439,808. In the construction disclosed in this patent, a magnetic flux cancelling circuit is provided to overcome the residual magnetism in the electromagnet when the electromagnet is deenergized.

The aforementioned deficiencies of known electromagnetic shear locks have largely been overcome through the structure of U.S. pat. No. 4,840,411. This patent discloses an electromagnetic shear lock in which the armature has an elongated projection which extends into a recess defined between the outer legs of an E-shaped electromagnet where the middle leg is of shorter length to enable reception of the projecting of the armature between the outer legs to provide mechanical reinforcement against forced opening. Additionally, a small air gap is defined between the armature projection and the middle leg of the electromagnet to combat any effects of residual magnetism when the electromagnet is de-energized. This electromagnetic shear lock has proved to be quite successful. However, the machining required on the armature and the electromagnet are quite expensive.

Accordingly, the present invention provides a new and improved electromagnetic shear lock with mechanical reinforcement which provides great resistance to attempted unauthorized entry, and is of reduced cost, and further provides a new and improved armature mounting arrangement.

SUMMARY OF THE INVENTION

Briefly stated an electromagnetic shear lock embodying the invention, in one form thereof, comprises an electromagnet adapted to be mounted to a door way and an armature adapted to be mounted to a door or vice versa in a position to be attracted to the electromagnet. An electromagnetic shear lock embodying the invention is preferably mounted within the soffit of a door way with the armature mounted into the door. The electromagnet assembly comprises an elongated core of E-shape cross section with an energizing coil positioned about the middle leg of the E-shaped core and between the outer legs of the core. Extension or support members forming part of the electromagnet assembly are affixed to each end of the electromagnet and have projections on either side thereof extending beyond the surfaces of the legs of the core. An armature member is adapted to be mounted to a door and positioned to be attracted by the electromagnet. The armature is elongated as is the electromagnet and in one form is relieved at the corners thereof whereby when the armature is attracted to the electromagnet, the projections of the extension members extend into the relieved portions of the armature and provide mechanical reinforcement to the lock when the electromagnet is energized. p In another form of the invention, the armature is relieved intermediate the longitudinal edges thereof at either end to form pockets or recesses and projections on the electromagnet assembly extend into such pockets or recesses when the armature is attracted to the electromagnet, to provide mechanical reinforcement against attempted shearing of the armature with respect to the electromagnet.

In either of the constructions described, the amount of material removed from the armature is substantially reduced leading to greater magnetic attraction between the electromagnet and the armature. Armatures embodying the present invention have very little magnetic material removed therefrom.

The invention further provides a new and improved armature assembly for a mechanically reinforced electromagnetical shear lock. A mounting plate for the armature is mounted below the top surface of a door and carries therein a plurality of spaced apart headed bolts which are threadably received therein for height adjustment dependent on the type of construction of the door. The armature has recesses in the underside thereof which receive the heads of the bolts. The armature rests on the heads of the bolts when not attracted to the electromagnet. The bolt heads act as guides for the armature and prevent any attempted rotation thereof. A leaf spring is secured to the mounting plate at the ends thereof and secured to the armature centrally thereof When the armature is attracted to the electromagnet, the spring is fixed and stores energy therein which acts to return the armature to a rest position on the bolt heads when the electromagnet is de-energized. The mounting plate may be positioned a variable distance below the edge surface of a door and the bolt heights adjusted to position the armature is essentially flush with the top of the door, or the bottom thereof if so mounted. Additionally, the armature is very slightly bowed concave to the electromagnet, but upon attraction the electromagnet will make flush full surface contact with the electromagnet. Then, when the electromagnet is de-energized the central portion of the armature will spring back, create a very small air gap, aid in overcoming residual magnetism, and the spring will then return the armature to a rest position.

An object of this invention is to provide a new and improved electromagnetic shear lock of reduced cost with substantial mechanical reinforcement.

Another object of this invention is to provide an electromagnetic shear lock having new and improved mechanical reinforcement.

A further object of this invention is to provide a new and improved universal mounting for the armature of an electromagnetic shear lock with mechanical reinforcement which may be utilized on almost all types of doors.

A still further object of this invention is to provide a magnetic shear lock assembly in which the amount of magnetic material removed from this armature is substantially reduced.

The features of the invention which are believed to be novel are particularly pointed out and distinctly claimed in the concluding portion of this specification. The invention, however, together with further objects and advantages thereof may best be appreciated by reference to the following detailed description taken in conjunction with the drawings.

DETAILED DESCRIPTION OF PREFERRED EMBODIMENTS OF THE INVENTION

Figure 1:
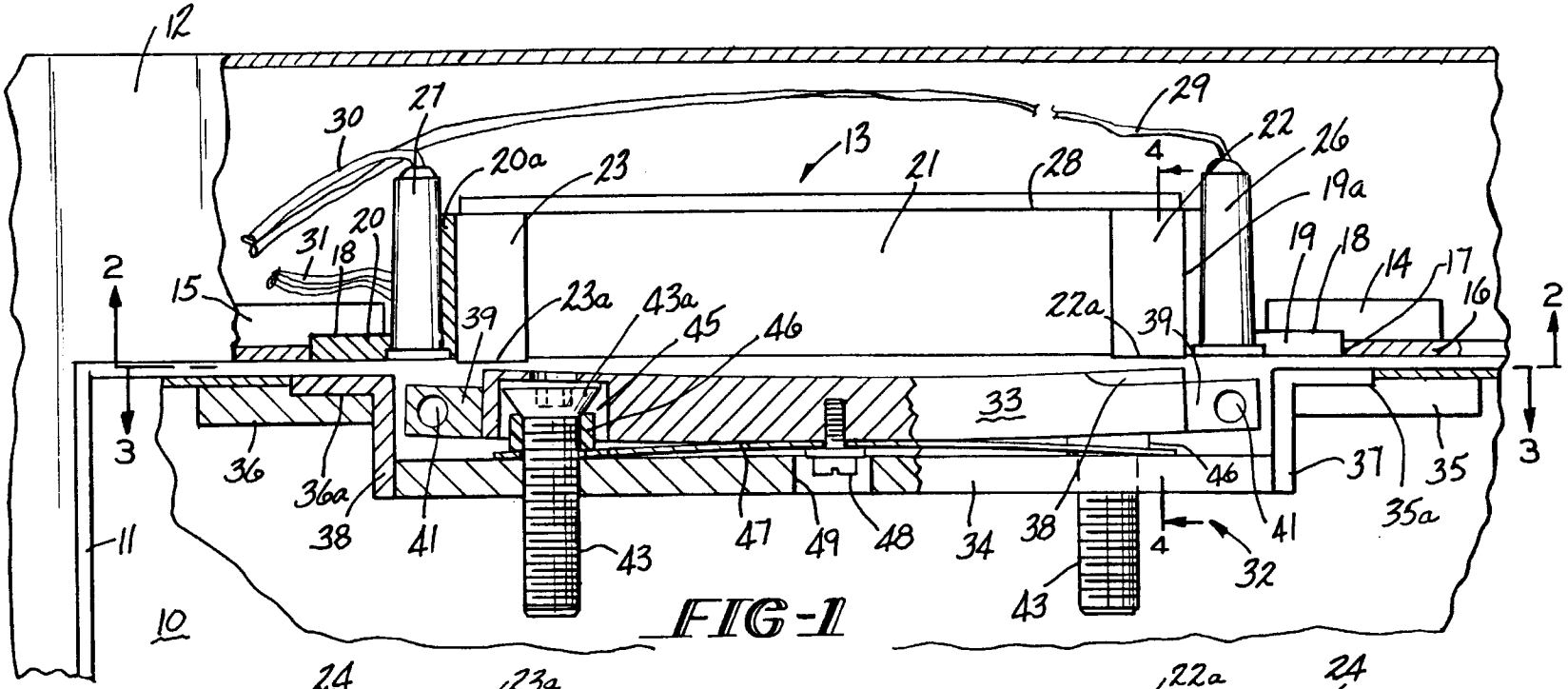
FIG. 1 is a front elevation of a portion of a door and door frame partially cut away to show the installation of an electromagnetic shear lock comprising an electromagnet and an armature embodying the invention and further cut away to show details of the construction of the electromagnet and armature.

FIG. 1 exemplifies a door 10 closing a doorway 11 defined by a door frame 12. The door 10, as shown, will be hinged on the right side.

Figure 2:
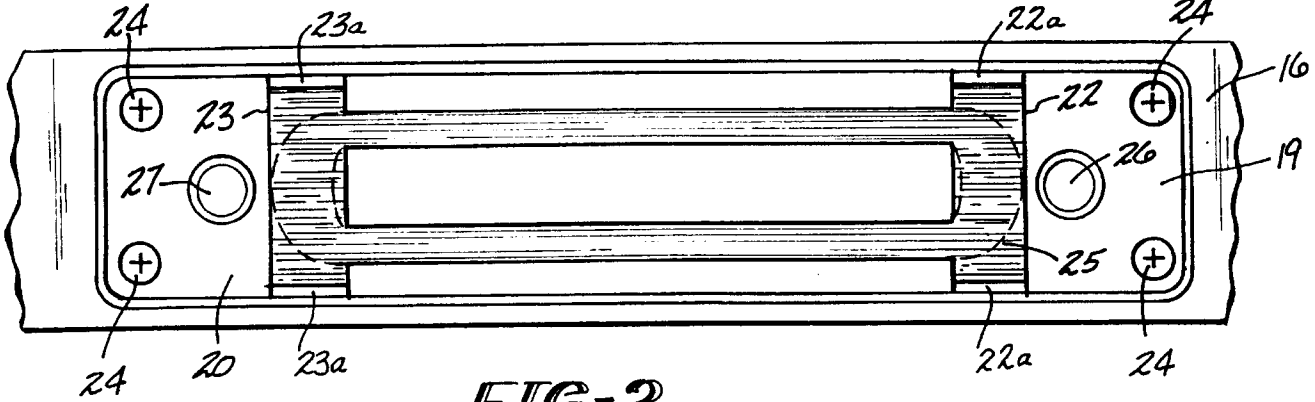
FIG. 2 is a view of the electromagnet of FIG. 1 seen in the plane 2—2 of FIG. 1.

In FIG. 1 the door frame 12 is shown as being of a hollow metal configuration and a portion is removed therefrom to permit insertion of an electromagnet assembly 13 when a portion of the soffit of the door frame has been removed to define an opening into the hollow interior. Mounting plates 14 and 15 are fixed to the soffit 16 of the doorway as by means of screws or bolts (not shown). The mounting plates 14 and 15 extend over a defined opening 17 in the door frame and are recessed on the bottom at 18. Non-magnetic L-shaped support members 19 and 20 which form part of the electromagnet assembly are secured to the recessed portions 18 of mounting plates 14 and 15 and provide upright arms 19a and 20a which receive electromagnet 13 therebetween. The electromagnet is secured to the upright arms 19a and 20a by a plurality of screws or bolts (not shown in FIG. 1). The electromagnet 13 is generally of E-shaped cross section with a coil wound about the middle leg and between the outer legs. The electromagnet 13 comprises a plurality of E-shaped laminations generally denoted by the reference numeral 21. Secured to either end of the stack of laminations are extension members 22 and 23 which receive the end portions of coil 25 as shown in FIG. 2. The extension members 22 and 23 have end projections 22a and 23a, respectively, which project below the laminations 21 and below soffit 16 for reasons hereinafter explained.

Reference is now made to FIG. 2 in conjunction with FIG. 1 to show the underside of magnet 13. The mounting plates 19 and 20 are shown as being fastened to the mounting plates 14 and 15 by a plurality of screws 24. The coil for the electromagnet is shown in broken line by the reference numeral 25 and is potted within the E-shaped electromagnet and the potting extends into the extension members 22 and 23, as further exemplified in FIG. 4.

Returning to FIG. 1 and also considering FIG. 2, at either end of the electromagnet supported on brackets 19 and 20 are reed switches 26 and 27, respectively, for purposes hereinafter described. Electromagnet 13 further includes a plate of magnetic material 28 to provide an increased path for magnetic flux, and which also acts as a structural member. Wires 29 and 30 lead from reed switches 26 and 27, respectively, to a control module (not shown) and wires 31 are connected to the coil 28 of the electromagnet for energization of the electromagnet.

The armature assembly 32 (FIGS. 1 and 3) comprises an armature 33 and a mounting or support member 34 therefor. On either side of the armature assembly 32 mounting plates 35 and 36 are attached to the undersurface of the top of door 10 and provide recessed mounting surfaces 35a and 36a, respectively, which receive angled support brackets 37 and :38, respectively, which in turn support mounting member 34.

Figure 3:
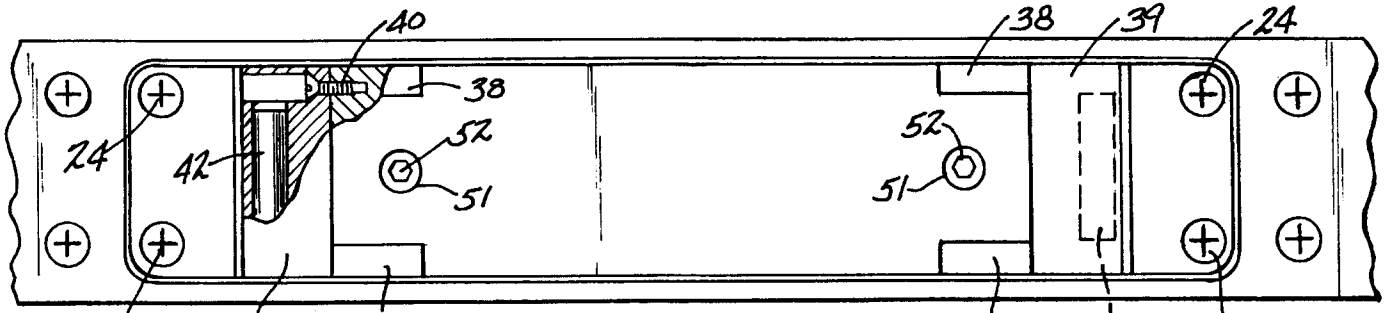
FIG. 3 is a view of the armature of FIG. 1 seen in the plane of lines 3—3 of FIG. 1, and is partially cut away to show details of construction.

Reference is made to FIG. 3. The armature 33 at each corner thereof has recesses or notches 38 cut therein.

Secured to either end of armature 33 are members 39 of non-magnetic material affixed thereto as by means of bolts 40 (FIG. 3). passages 41 are at least partially drilled through each of members 39 to receive permanent magnets 42 adapted to actuate the reed switches 26 and 27 (FIG. 1) for purposes hereinafter described.

The mounting members 34 has two spaced apart height adjustable armature support members shown as bolts or screws 43 having heads 43a (only one shown). The heads of the bolts extend into recesses 45 defined in the under surface of armature 33 (only one shown). Beneath the head of each of the bolts is a collar 46 which bears on an end of a leaf spring 47. Spring 47 at the middle thereof is fastened to armature 33 by means of a bolt or a screw 48 extending through n passage 49 in support member 34. In the un-energized condition of electromagnet 13, as shown in FIG. 1, the armature 33 rests on the heads 43a of bolts 43.

Figure 5:
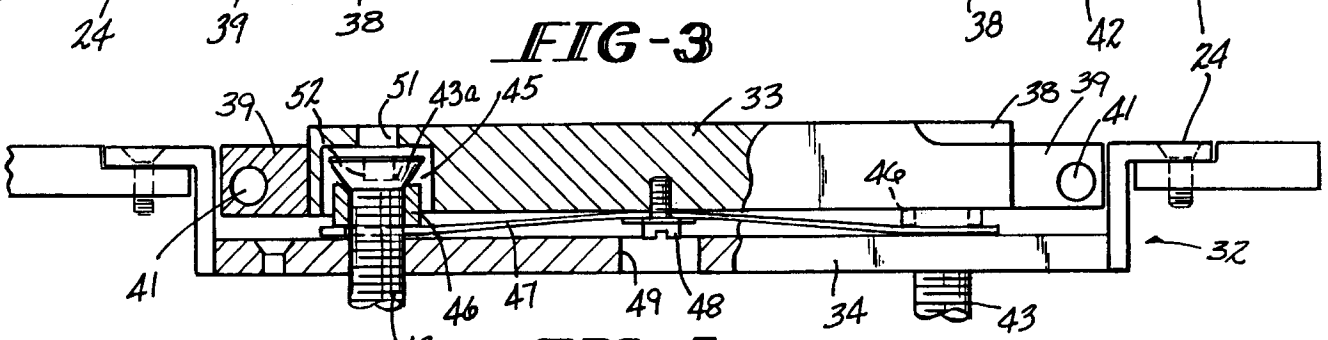
FIG. 5 is a view of the armature of FIG. 1 showing the armature extend in an attracted position.

FIG. 5 exemplifies the armature when the electromagnet is energized and armature 33 is attracted thereof. Armature 33 moves up off the heads 43a of bolts 43 and spring 47 is flexed, storing energy therein. At this time, projections 22a and 23a on the electromagnet assembly enter into notches 38 at the four corners of the armature to provide mechanical reinforcement to the lock as exemplified in FIG. 4. Also, at this time the attraction of the armature to the electromagnet flattens out the slightly bowed armature and the upper armature surface is in contact with all three legs of the electromagnet, as exemplified in FIG. 4.

The bolt heads further act as guides for the armature 33 and prevent any attempted rotation thereof. The upper surface of armature 33 is very slightly bowed concave When the armature is attracted to the magnet this bow will flatten out and there will be full surface contact of the armature on the three legs of the electromagnet. However, When the electromagnet is deenergized, the armature will return to its slightly bowed concave condition helping to overcome any effects of residual magnetism. Also at that time the spring 47 is flexed and has energy stored therein which will aid in pulling the armature back to the position shown in FIG. 1.

Small passages 51 are defined in armature 33 leading to recesses 45 and sockets 52 in the heads bolts 43 and 44 (See FIG. 3). Sockets 51 are adapted to receive a turning tool such as an Allen wrench. This permits height adjustment of bolts 43 to align armature 33 with the top of door 10. This arrangement also serves to permit adjustment of the space between armature 33 and support member 34 for different types of doors, as will hereinafter be made apparent.

Figure 4:
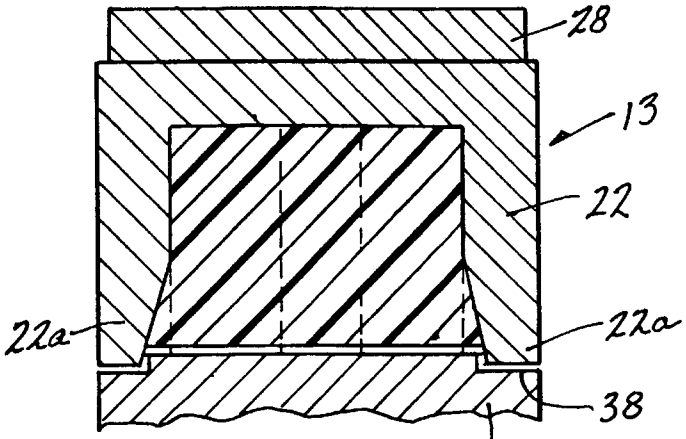
FIG. 4 is a view of the electromagnet and armature of FIG. 1 seen in the plane of lines 4—4 of FIG. 1 when the electromagnet is energized.

It will be noted that the projections of 22a and 23a members 22 and 23 below the legs of electromagnet 13 are essentially aligned with the notches 38 in armature 33 and upon energization of the electromagnet will enter into notches 38 at each corner of armature 33, as best exemplified in FIG. 4. This provides mechanical re-enforcement against unauthorized opening of door 10 when the electromagnet is energized.

The dimension across the end surfaces of the members 22 and 23 is slightly greater than the length dimension of armature 33 as shown in FIG. 1. This is to facilitate alignment of the armature 33 with the electromagnet and vice versa upon installation in the door. The projecting legs 22a and 23a of members 22 and 23 have an interior surface angled at 15 to 30 degrees (See FIG. 4). The angles or bevels are provided so that the legs 22a and 23a will not bind when the electromagnet is de-energized an immediate attempt is made to open the door.

The described construction requires minimal removal of magnetic material from the armature and in particular none in the central portion, and therefore does not substantially detract from the holding force between the armature and the electromagnet. The upper surface of the armature has no projections.

Figure 6:
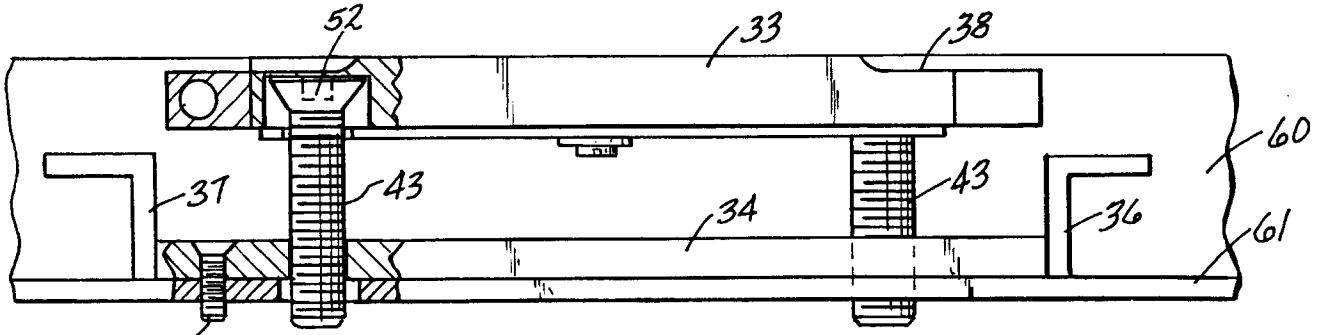
FIG. 6 is a front elevation of the armature of FIG. 1, but showing a different mounting arrangement.

The armature mounting system disclosed herein may be utilized on many types of doors such as hollow metal and wood doors as exemplified in FIG. 1, as well as doors which have channels or rails therein recessed from the top edge. FIG. 6 exemplifies a door 60 having a recessed horizontal channel or rail 61 where the armature support member 34 is attached to channel or rail 61 as by means of a plurality of screws 62(only one shown). In some cases there are aluminum channel doors where the top rail is only one eighth inch below the upper edge of the door in such case the brackets 36 and 37 could be secured directly to this rail after a portion thereof was removed so that the door may accept the armature assembly.

The reed switches 26 and 27 are utilized to signify to a remote location that the door is closed or opened.

Figure 9:
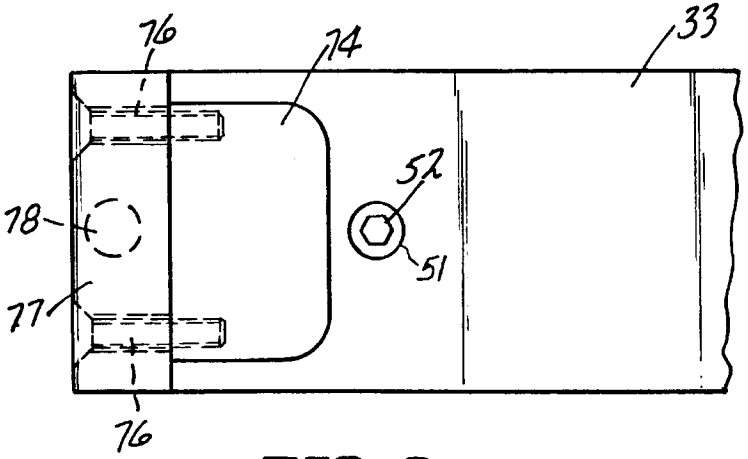
FIG. 9 is a view seen in the plane of lines 9—9 of FIG. 7.
Figure 10:
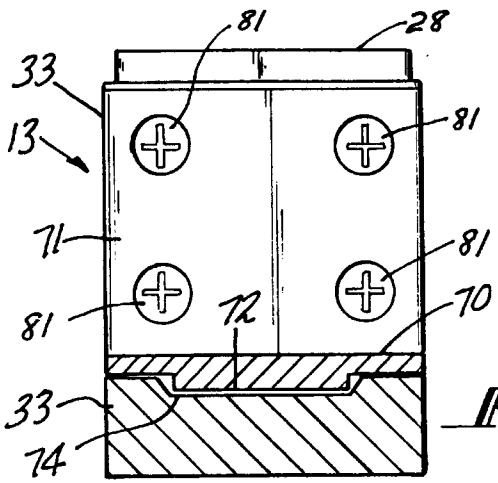
FIG. 10 is a view partially ill section seen in the plane of lines 10—10 of FIG. 7.
Figure 7:
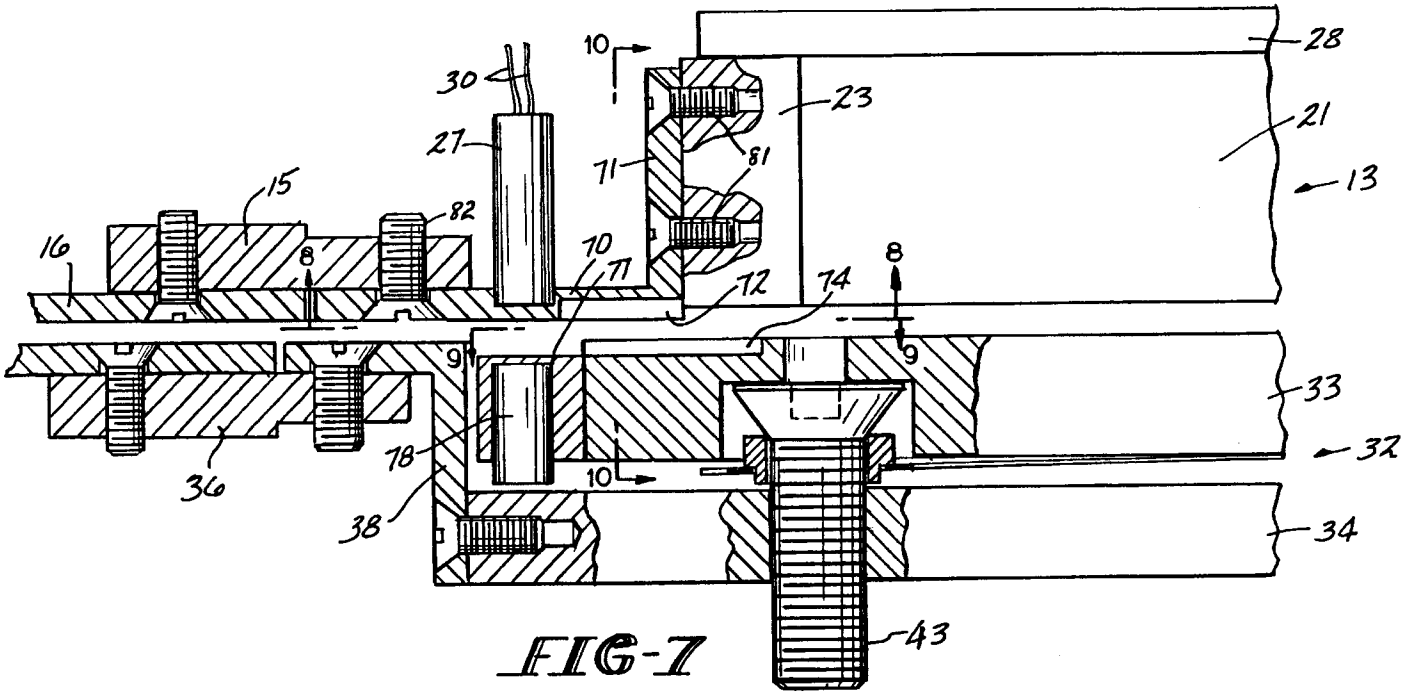
FIG. 7 is a fragmentary view similar to FIG. 1.
Figure 8:
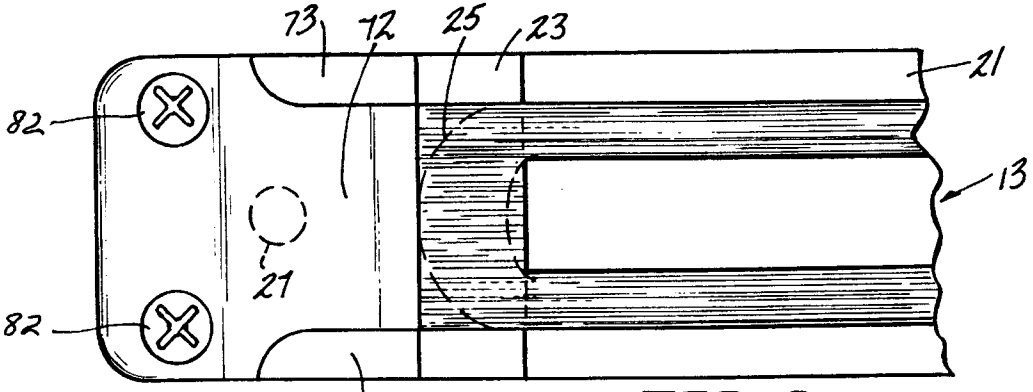
FIG. 8 is a view seen in the plane of lines 8—8 of FIG. 7.

FIGS. 7–10 exemplify another embodiment of the invention where the electromagnet assembly support members engage a recess in the armature to provide mechanical reinforcement upon energization of the electromagnet. In FIGS. 7–10 similar elements to those shown in the embodiment of FIGS. 1–6 are identified by the same reference numeral. In FIGS. 7–9 the electromagnetic shear lock assembly is shown only at one end thereof, it being understood that the other end is the same and symmetrical thereto.

Reference is now made to FIG. 7. The brackets are shown as inverted with respect to FIG. 1 and mount thereon angled support member 70 having an upright leg 71 which supports the electromagnet 21. In this embodiment the extension member 23 has no projections but is merely provided to receive the curved ends of coil 25. Support member 70 has on the bottom thereof a projection 72 defined by recesses 73 on either side thereof. As shown in FIG. 9 armature 33 has a recess 74 defined 81 either end thereof intermediate the longitudinal edges thereof which is arranged to receive the projection 72 when the electromagnet is energized. In this case, the projection on the armature assembly which includes support angle 70 is intermediate the side edges of the armature and when the armature is attracted to the electromagnet the projections 72 will be received within the recesses 74 and provide mechanical reinforcement.

Affixed to either end of the armature 33 as by means of bolts 76 is a non-magnetic member 77 which carries a permanent magnet 78 for the purposes hereinbefore described, that is to, cooperate with reed switch 27. As shown in FIG. 7 the mounting plate 36 is inverted with respect to FIG. 1.

The angled electromagnet support brackets 70 may be cut from extruded lengths or stainless steel and affixed to extension member 23 by a plurality of bolts 80. The horizontal legs of mounting plates 70 are affixed to brackets 15 by means or bolts 81. With this construction any forces tending to force open the door are transferred to the door itself.

The embodiments or the disclosed invention provide for increased mechanical reinforcement of a electromagnetic shear lock without requiring any substantial expense in the construction of the electromagnet or the armature. The projections from the electromagnet assembly may engage recesses in either the four corners of the armature or recesses at either end thereof. The recesses are very economical to define in the armature.

It may thus be seen that the objects of the invention set forth, as well as those made apparent from the foregoing description, are efficiently attained. While a preferred embodiment of the invention, has been set forth for purposes of disclosure, modifications to the disclosed embodiment of the invention, as well as other embodiments thereof, may occur to those skilled in the art. Accordingly, the appended claims are intended to cover all embodiments of the invention and modifications to the disclosed embodiment which do not depart from the spirit and scope of the invention.

What is claimed is:

1. An electromagnetic shear lock comprising an electromagnet assembly adapted to be mounted to a doorway and an armature adapted to be mounted [t] *to* to a door in a position to be attracted to the electromagnet, said electromagnet assembly comprising an elongated core having an E-shaped cross section with an energizing coil positioned about the middle leg of said E-*shaped core and between the outer legs of said E-shaped core,* said electromagnet assembly comprising support means for supporting said electromagnet in said doorway, said support means having projections at both ends of said electromagnet assembly extending beyond the surfaces of said legs, an armature member having a generally rectangular surface adapted to be mounted to a door, said armature member being relieved at the ends thereof whereby when said armature is attracted to said electromagnet, said projections extend into the relieved portions of said armature member.

2. The lock of claim 1 where said electromagnet assembly includes support means at either end supporting said electromagnet in said doorway, said projections being defined on said support means.

3. The lock of claim 2 where said armature has recesses defined, from the upper surfaces thereof at either end thereof intermediate the longitudinal side edges thereof to receive said projections.

4. The lock of claim 3 where said recesses have opposed side edges.

5. The lock of claim 4 where [the bevels are on] the edges defining said recesses in said armature *have bevels.*

6. The lock of claim 5 where the bevels are at an angle of 15° to 30°.

7. An electromagnet shear lock comprising an electromagnet adapted to be mounted to a doorway and an armature assembly comprising an elongated base member adapted to be secured to a door, said base member receiving a plurality of spaced apart height adjustable devices therethrough with heads of said devices extending above said base member, an elongated armature having spaced apart recesses receiving said heads, said armature resting on said heads when not attracted to said electromagnet, and an elongated leaf spring secured to said armature intermediate the ends thereof and secured to said base member adjacent the ends therein whereby said spring exerts a return force on said armature when said armature is attracted to said electromagnet.

8. The lock of claim 7 wherein said heads in said recesses act as vertical guides for said armature and prevent rotation thereof.

9. The lock of claim 7 wherein said heads have a socket therein for receiving a turning tool, and small passages in said armature leading to said recesses so that a turning tool may be inserted in said sockets.

10. The lock of claim 7 where said armature in an unattracted position is bowed slightly concave to said electromagnet.

11. The lock of claim 7 where said base member is secured to said door by said height adjustable devices.

12. An electromagnetic shear lock of the type where there is mechanical interlocking between the [electromagnetic] *electromagnet* and the armature, comprising an armature support member adapted to be affixed to a door, said support member having spaced apart height adjustable members threaded therein, said height adjustable members having heads thereon, an armature having recesses in the underside thereof receiving said heads, said armature resting on said heads when not attracted to the electromagnet, said heads having a socket therein for receiving a turning tool, small passages defined through said armature to said recesses to provide access to said sockets, and a leaf spring secured to said armature centrally thereof and having ends secured to said height adjustable members below the heads thereof.

13. The lock of claim 12 wherein said heads in said recesses act as vertical guides for said armature and prevent rotation thereof.

14. The lock of claim 12 wherein said armature in an unattracted position is bowed slightly concave to said electromagnet.

15. An electromagnetic shear lock comprising an electromagnet assembly adapted to be mounted to one of a doorway or a door and an armature adapted to be mounted to the other of the doorway or *the door* in a position to be attracted to the electromagnet;

said electromagnet assembly having opposed ends and comprising an elongated core and an energizing coil, said core defining an attracting surface;

said electromagnet assembly including support means at each end for supporting said electromagnet, said support means having projections at both ends thereof extending beyond said attraction surface; and an armature having a second surface adapted for mounting and positioning to be attracted by said electromagnet assembly and engage said attraction surface, said armature defining recesses at spaced end locations thereof whereby when said armature is attracted to said electromagnet, said projections extend into the recesses of said armature.

16. The lock of claim 15 wherein said recesses are each defined by opposing side edges located at intermediate transverse positions at said ends.

17. The lock of claim 15 wherein when a shear force is exerted between said armature and said electromagnet, said projections engage recess defining portions of said armature so as to force said attracting surface and said second surface to maintain an engaged relationship.

18. The lock of claim 1 wherein when a shear force is exerted between said armature and said electromagnet, said projections engage portions of said armature so as to urge said armature into engagement with said electromagnet.

*19. An electromagnetic shear lock comprising an electromagnet assembly adapted to be mounted to one of a doorway or a door and an armature adapted to be mounted to the other of the doorway or the door in a position to be attracted to the electromagnet assembly,*

*said electromagnet assembly comprising an elongated core and an energizing coil, said core defining a first attracting surface,*

*said electromagnet assembly comprising longitudinally spaced end portions, said core and coil being disposed between said end portions, each said end portion comprising a raised portion at intermediate transverse positions thereof;*

*said armature comprising a second surface adapted to engage said first attracting surface, said armature having at opposite longitudinally spaced positions transversely spaced edge portions extending from said second surface to receive said raised portions when said first and second surfaces engage to thereby maintain an engaged relationship between said electromagnet assembly and said armature.*

*20. The lock of claim 19 wherein said edge portions are bevelled.*

*21. The lock of claim 20 wherein said edge portions are bevelled at an angle of 15°–20° relative to a normal line to said second surface.*

*22. The lock of claim 19 wherein when a shear force is exerted between said armature and said electromagnet assembly, said raised portions engage edge portions of said armature so as to force said first and second surfaces to maintain an engaged relationship.*

*23. An electromagnetic shear lock comprising an electromagnet assembly adapted to be mounted to a doorway and an armature adapted to be mounted to a door in a position to be attracted to the electromagnet assembly,*

*said electromagnet assembly comprising an elongated E-shaped core and a coil between the outer legs of said E-shaped core, said electromagnet assembly comprising longitudinally spaced end portions, said core and coil being disposed between said end portions, each said end portion comprising a raised portion at intermediate transverse positions thereof,*

*said armature having an attraction surface adapted for attraction to said electromagnet assembly, said armature at opposite longitudinally spaced positions having transversely spaced edge portions extending from said attraction surface to receive said raised portions when said armature is attracted to said electromagnet assembly to thereby maintain an engaged relationship between said electromagnet assembly and said armature member.*

*24. An electromagnet shear lock comprising an electromagnet adapted to be mounted to a doorway and an armature assembly comprising an elongated base member adapted to be secured to a door, said base member receiving a plurality of spaced apart height adjustable devices therethrough with heads of said devices extending above said base member, an elongated armature having spaced apart recesses receiving said heads, said armature being disposed in a rest position relative to said heads when not attracted to said electromagnet, said height adjustable devices defining the height of said armature above said base member at said rest position, and spring means for exerting a return force on said armature to return said armature to said rest position when said armature is attracted to said electromagnet.*

*25. The lock of claim 24 wherein said heads in said recesses act as vertical guides for said armature and prevent rotation thereof.*

*26. The lock of claim 24 wherein said heads have a socket therein for receiving a turning tool, and small passages in said armature leading to said recesses so that a turning tool may be inserted in said sockets.*

*27. The lock of claim 24 wherein said armature in an unattracted position is bowed slightly concave to said electromagnet.*

*28. An electromagnetic shear lock of the type where there is mechanical interlocking between the electromagnet and the armature comprising an armature support member adapted to be affixed to a door, said support member having spaced apart height adjustable members threaded therein, said height adjustable members having heads thereon, an armature having recesses in the underside thereof receiving said heads, said armature being disposed in a rest position relative to said heads when not attracted to the electromagnet, said height adjustable members defining the height of said armature above said support member at said rest position, said heads having a socket therein for receiving a turning tool, small passages defined through said armature to said recesses to provide access to said sockets, and spring means comprising a spring for biasing said armature to said rest position.*

*29. The lock of claim 28 wherein said heads in said recesses act as vertical guides for said armature and prevent rotation thereof.*

*30. The lock of claim 28 wherein said armature in an unattracted position is bowed slightly concave to said electromagnet.*

* * * * *

UNITED STATES PATENT AND TRADEMARK OFFICE

CERTIFICATE OF CORRECTION

PATENT NO. : Re. 35,146
DATED : January 16, 1996
INVENTOR(S) : George Frolov

It is certified that error appears in the above-indentified patent and that said Letters Patent is hereby corrected as shown below:

Column 7, line 41, delete "to" (third occurrence).

Column 7, lines 46 and 47, "E-shaped core and between the outer legs of said E-shaped core," should not be italicized.

Column 8, line 8, "an" should be italicized.

Column 8, line 15, "an" should be italicized.

Signed and Sealed this

Third Day of December, 1996

*Attest:*

Bruce Lehman

BRUCE LEHMAN

*Attesting Officer*

*Commissioner of Patents and Trademarks*